(12) United States Patent
Tuchman et al.

(10) Patent No.: US 7,658,327 B2
(45) Date of Patent: Feb. 9, 2010

(54) VIRTUAL RETAIL ASSISTANT

(75) Inventors: Kenneth D. Tuchman, Englewood, CO (US); Henry Truong, Chelmsford, MA (US)

(73) Assignee: Teletech Holdings, Inc., Englewood, CO (US)

( * ) Notice: Subject to any disclaimer, the term of this patent is extended or adjusted under 35 U.S.C. 154(b) by 570 days.

(21) Appl. No.: 11/538,259

(22) Filed: Oct. 3, 2006

(65) Prior Publication Data

US 2007/0138268 A1 Jun. 21, 2007

Related U.S. Application Data

(60) Provisional application No. 60/723,352, filed on Oct. 3, 2005.

(51) Int. Cl.
*G06F 7/08* (2006.01)
(52) U.S. Cl. ........................... 235/381; 235/375
(58) Field of Classification Search ............... 235/381, 235/375, 487; 705/8, 5
See application file for complete search history.

(56) References Cited

U.S. PATENT DOCUMENTS

| | | | |
|---|---|---|---|
| 2002/0077933 A1 | 6/2002 | Dutta et al. | 705/27 |
| 2002/0082931 A1 | 6/2002 | Siegel et al. | |
| 2002/0120674 A1 | 8/2002 | Son et al. | 709/202 |
| 2003/0085275 A1 | 5/2003 | Barkan | |
| 2003/0131023 A1* | 7/2003 | Bassett et al. | 707/200 |
| 2004/0039742 A1 | 2/2004 | Barsness et al. | 707/10 |
| 2004/0181461 A1* | 9/2004 | Raiyani et al. | 705/26 |
| 2005/0097000 A1 | 5/2005 | Freishtat et al. | 705/26 |
| 2005/0156031 A1 | 7/2005 | Goel et al. | |
| 2005/0209868 A1 | 9/2005 | Wan et al. | 705/1 |
| 2008/0191878 A1* | 8/2008 | Abraham | 340/572.1 |

* cited by examiner

*Primary Examiner*—Edwyn Labaze
(74) *Attorney, Agent, or Firm*—Stanley J. Gradisar Attorney At Law

(57) ABSTRACT

The present invention, as embodied in the claims, relates to customer care management via a communications systems and methods including, in embodiments, a combination of automated and human services to be provided to a customer in a retail store environment in real time. For example, one embodiment of the present invention provides an automated method for assisting a customer in a retail store comprising: identifying the customer; periodically identifying the customer's position in the store; identifying a product of interest to the customer; and communicating information to the customer via a remote specialized sales agent or other audio, visual and/or computer data relevant to the customer.

17 Claims, 6 Drawing Sheets

VIRTUAL RETAIL ASSISTANT

RELATED APPLICATION

This application claims priority to provisional U.S. patent application Ser. No. 60/723,352, filed Oct. 3, 2005, wherein the disclosure of this patent application is incorporated herein by reference in its entirety for everything the provisional application teaches.

FIELD

Embodiments of the present invention relate to facilitating sales and marketing to individual customers in a retail store environment. In particular, embodiments of the present invention relate to automated communication systems and methods, in a retail store environment, for responding to inquiries from individual customers, for providing expert product information to such customers, for providing marketing information pertinent to an individual customer's interests, and for facilitating sales transactions.

BACKGROUND

As the retail industry has evolved into a "big box" model, the environment has moved away from being able to provide competent and personalized customer support. Due to competitive cost pressures, the retail staff in today's large retail stores is not well trained and must support a vast array of products. With high turnover of staff and limited training and product competency, customers have had to be more self-sufficient to select the appropriate products that fit their needs.

Complicating the retail sales process is that many products sold in retail environments have become increasingly sophisticated and complex. Today's "big box" electronics retailers stock thousands of different products in each store. Yet, in the face of ever increasing product complexity, the retailers rely on sales and customer service staff that receive limited product training and tend to "turn over" at a high annual rate. In many cases, retailers face fierce pricing pressures, forcing them to increase operational efficiencies and cut costs. Due to these pricing pressures, retailers often have a difficult time providing quality product information and sales support in their stores. Additionally, retailers have no way of identifying their prime customers when they walk in the door and no way to connect the customers to any concierge services for an improved shopping experience. The poor shopping experience can reduce customer spending, create an impaired customer experience, increase customer returns, raise product dissatisfaction, and motivate customer defection.

From a customer's perspective common issues include: 1) the customer is unable to get attention or service when he or she needs it; 2) the sales staff is not knowledgeable regarding the product(s) the customer wants; 3) the customer makes purchase decisions in a vacuum without assistance from sales staff or objective third parties; 4) the customer cannot locate the desired product in the store; and, 5) the customer's online shopping experience is disconnected from his or her in-store shopping experience. From the retailer's perspective, common issues include: 1) employee attrition is very high; 2) employees' sales effectiveness is constrained by limited experience; 3) training costs for products and services are high; 4) product training for staff is not always effective; 5) customers are often better informed than sales staff; 6) lost opportunities for sales of complementary products and services; and 7) a retailer's most valued customers are not "recognized" when they enter the store, and opportunities are lost to ensure a high quality shopping experience and repeat visits by those customers.

Attempts have been made to provide limited solutions to some of these issues by substituting mechanical "kiosks" for store personnel. The companies deploying customer kiosks focus on doing a few things very well and making the experience quick and convenient. Examples of kiosks dedicated to a specific use include ATMs, "pay at the pump" auto fuel facilities, and airline "check-in" modules. These kiosks have been successful in supplying convenient, focused service. In each instance, however, the automated kiosk service is limited to facilitating a transaction or completing part of a transaction that an individual customer has already decided to make. Kiosks are much less useful in providing information or services to an individual customer contemplating whether or not to make a purchase or what purchase to make. In some instances, customers have been slow to accept kiosks (for example, grocery store self serving check-out stations) where customers have a long-standing experience with the convenience of personal service.

Kiosks located in retail stores have also been created to provide general product information and sales help. However, these facilities have generally failed because the retail store kiosks are not well designed. Frequently, the retail store kiosks are placed in poor locations to prevent disruption of traffic patterns in key locations in the store. At times the retail store kiosks are underutilized or are inadequate to meet current customer demand. Many kiosks limit the customer to using self-help, i.e., customer initiated inquiries, to mechanically delivered, i.e., pre-recorded, information only. When the processes become more complex, and account information is incorporated, customers may believe they do not have sufficient privacy and that the kiosk hinders, rather than helps, the situation. Finally, many kiosks are not portable and are not usable in a store aisle where the customer has simultaneous access to the desired product or products. While some mobile applications, e.g., "smart screen shopping assistant," are currently being developed for use by individual customers, they still suffer from many of the same deficiencies of stationary kiosks, i.e., limited flexibility and content.

SUMMARY

The present invention, as embodied in the claims, relates to customer care management via a communications systems and methods including, in embodiments, a combination of automated and human services to be provided to a customer in a retail store environment in real time. Electronics retailing is frequently cited, but this technology is intended to be used in a number of retail stores where the breadth of products and their complexity make it challenging for shoppers to make informed purchasing decisions. As an example, in the home improvement retail market, the retailers are generally large organizations with large inventories of products. It can be challenging to locate products, given the large inventories, and, when found, shoppers often require some coaching and information on the products they would like to purchase. Getting properly served is quite challenging for customers and maintaining a high quality customer experience is equally challenging for retailers, due to fiercely competitive pricing and constantly changing environments.

Embodiments of the present invention provide customers with instantaneous live assistance from highly trained, competent, "expert," retail agents (sometimes referred to herein simply as "agents"). These agents educate a customer to make a better informed purchase decision that will drive satisfaction with the product purchased and reinforce loyalty to retail establishments. The "live agent interaction" provides advantages to both the customers and retailers by ensuring adequate, but efficient, staffing that is vital to retail sales effectiveness. As such, embodiments of the invention employ advanced workforce management techniques to ensure proper staffing of critical support functions to match the actual customer-traffic patterns inside each retail store location. The human resources, in embodiments, are located in one or more "call centers" serving the retailer and/or manufacturer locally, regionally, nationally, or globally.

In addition, effective use of these human resources is enhanced by embodiments of the invention that link the nature of the customer's inquiry with the most effective, available human resource to provide a response. In further embodiments, the historical volumes of voice calls, email and chat interactions are used to model and predict future staffing needs. Historical contact information is loaded and used to generate future staffing models that allow staffing according to anticipated needs. Embodiments of the present invention help predict the need for staffing and create work schedules for the agents in the contact center that match the expected needs.

In further embodiments, live agent interaction is coupled with other information provided by product manufacturers to ensure consistent product information and/or access to current rebates, coupons and other marketing programs from the manufacturer and/or retailer. For example, embodiments of the invention employ technology to deliver automated assistance when desired by the customer. This automated assistance may include highly accurate product information delivered directly, from the manufacturer in rich video formats, to shoppers in real time. Using an inline analytics engine that uses business rules, embodiments of the invention collect in-store location information and customer computer activity, and anticipate a customer's behavior/interests to provide relevant and timely product and or marketing information (e.g., current coupons, specials, etc.) to the customer that increases sales activity for the retailer. Further, other embodiments of the invention also proactively contact customers who appear to need assistance, while operating unobtrusively for the expert shoppers.

Embodiments of the invention identify and recognize the retailer's best customers the moment each customer begins using the system in the store. The customer identity is then used to access a database of information relating to that customer including, for example, the customer's prior purchases, prior interaction with the retailer's web site, other interactions with customer service, etc. In addition, embodiments of the invention also accumulate highly valuable customer behavior information by recording each customer's movements through the store and adds this information to a database. These traffic patterns in the store are stored in a data warehouse and are analyzed in both real time and in historical context. The system, in embodiments, then works to ensure the best possible customer experience through highly accessible product information, ties to online accounts and interaction with the retailer's loyalty and rewards programs. This customer movement data assists the retailers to improve their merchandising effectiveness and provides the information to manufacturers to improve their own merchandising efforts and product mix.

Among other things, the embodiments of the present invention provide a communications system for providing a virtual sales agent to assist a customer in a retail store including a network comprising: a portable wireless communication device comprising: (a) means to input alphanumeric data and to transmit that data to a network, (b) means to transmit and receive voice communications with a remote specialized sales agent, and (c) means to receive video or photographic information such as product information. Further, embodiments of the present invention comprise means associated with the portable wireless communications device to identify the customer; means for scanning information associated with a product and to transmit that information via the network; a database containing information associated with the customer; means to identify the position of the customer in the store and to associate that location with products and services located in the vicinity; and means to predict the customers interests or information that may be of interest to the customer based on the information transmitted by the customer via the wireless device, information identifying a product received from the scanner, information associated with the customer from the database, and/or information regarding the customers location in the store.

Also, embodiments of the present invention provide an automated method for assisting a customer in a retail store comprising: identifying the customer; periodically identifying the customer's position in the store; identifying a product of interest to the customer; and communicating information to the customer via a remote specialized sales agent or other audio, visual and/or computer data relevant to the customer. The information provided to the customer, in embodiments, is based on one or more of: (a) current and/or historical information regarding the customer pertaining to the customer's interests, (b) the customer's position or movement in the store, and/or (c) the identity of the product. The present invention, in embodiments, provides one or more of the following functions, but is not limited to the following functions: instant access to qualified customer service, technical support, instant coupons, rebates for time-sensitive products, ties to the retailer and/or a manufacturer's loyalty system, access to inventory systems, access to in-store position, tracking of customer in-store behaviors, recommendation of product based on what is in-stock or out-of-stock.

Embodiments of the present invention differ from retail kiosks in a number of ways. For example, the embodiments of the present invention provide tight integration with a contact center, provide skilled agents at the touch of a button, and provide qualified support far superior to currently available in-store assistance. The invention, in embodiments, also offers proactive support when a customer appears to be struggling or there are indicators that the customer may need help; embodiments of the present invention also initiate contact with the customer to see if he or she needs assistance. Further, the invention, in embodiments, is proactive in attempting to facilitate the sale of products of interest to the customer based on the current behavior of the customer in the store and from historical information in the database. Other embodiments of the invention also make suggestions to the customer for additional products and services of interest, and/or ensure that the customer does not leave the store without other items required for use with the products purchased, for example, software, peripherals and connectors.

The communications capability of embodiments of the invention are personal to the customer and portable inside the store. Unlike a fixed kiosk, embodiments of the invention comprise a "wireless kiosk" that is a portable handheld device. The wireless kiosk includes a keypad or other data input device, audio and visual communications capability, and, in some embodiments, a scanner that allows the customer to identify, for example, by a bar code or radio frequency identification (RFID) tag, a product of potential interest for purchase. In exemplary embodiments, for security reasons and otherwise, the wireless kiosk is permanently affixed to an in-store shopping cart that is physically restricted from removal from the retailer's premises. Each customer, in embodiments, has his/her own communications device and communications and information are personalized for that customer's interests.

Embodiments of the system monitors each customer's location and uses that location information, along with click stream and historical information from a database, to predict customer preferences. Thus, embodiments of the invention understand where a customer is located inside of the store and also analyzes the items that the customer is currently investigating. In further embodiments, the system captures event and transaction data that surpasses the abilities of standard kiosks.

In further embodiments, the system is analytics driven. Inline analytics receive location, event and transaction data along with customer profile information and business rules to make decisions in real time as the customer is shopping. Embodiments of the present invention incorporate in-store dispatching and check out services to ensure a speedy check out for the customer and improve the efficiency of the internal operations for the retailer.

No entity currently provides a system with the above-described capabilities. These capabilities improve the customer's experience and enable a retailer both to cut costs and to increase sales per customer. Accordingly, the embodiments of the present invention provide the advantages of: injecting capabilities of "customer care management" (frequently used in post purchase environments) into the retail environment in real time, informing and educating customers to make informed purchase decisions and drive customer satisfaction and loyalty, giving manufacturers and retailers the ability to create and deliver consistent and accurate product content of specific interest to individual customers in a retail environment at the point of purchase, adding personalization and competency back into "big box" retail environments, and providing qualified, well-trained, live assistants that are staffed to match actual traffic patterns in each retail location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present invention may be more readily described by reference to the accompanying drawings in which.

DETAILED DESCRIPTION

This disclosure will now more fully describe some embodiments with reference to the accompanying drawings, in which only some of the possible embodiments are shown. Other aspects may, however, be embodied in many different forms and should not be construed as limited to the embodiments set forth herein. Rather, these embodiments are provided so that this disclosure will be thorough and complete and will fully convey the scope of the possible embodiments to those skilled in the art.

Figure 1A:
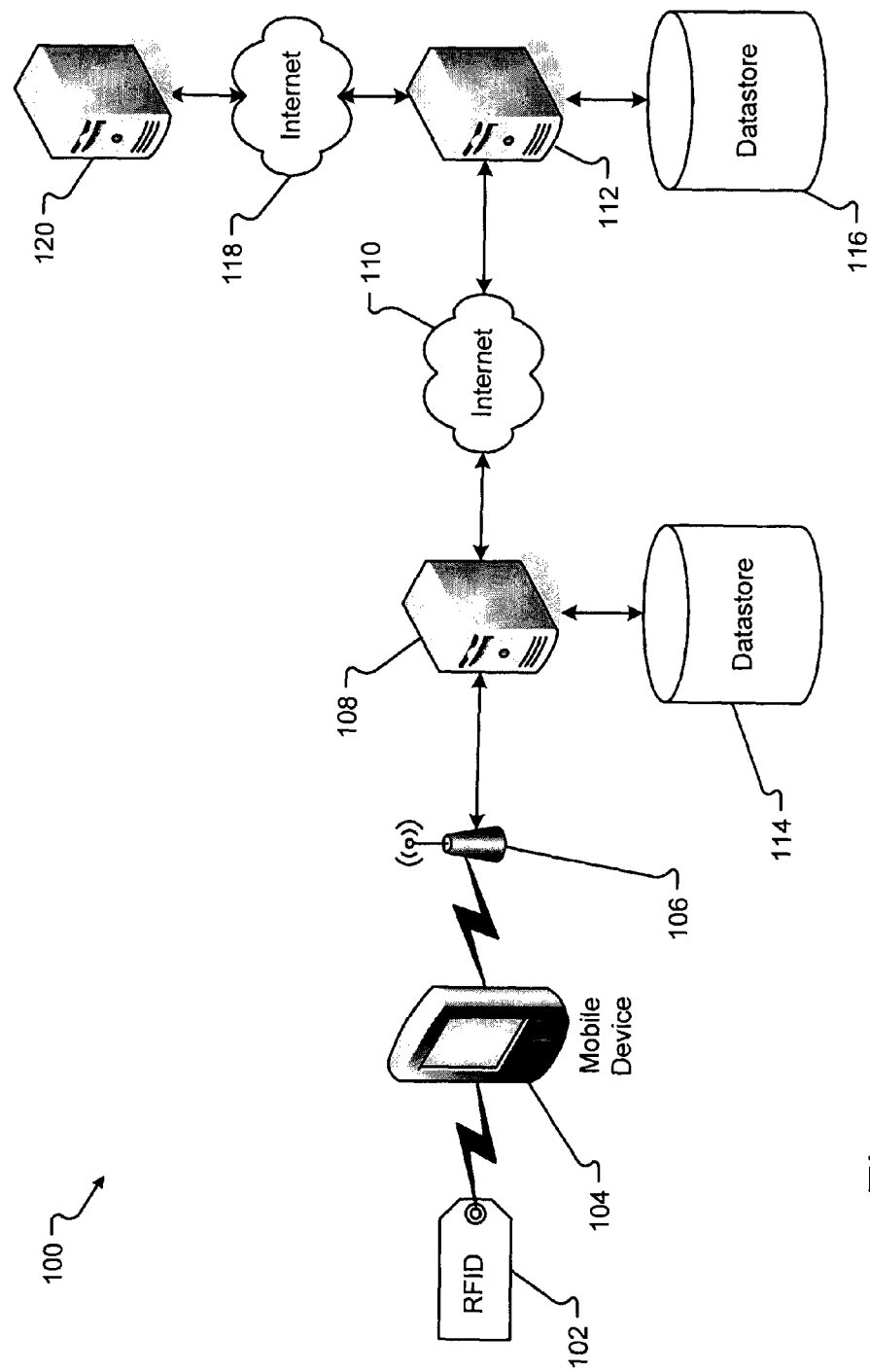
FIG. 1A is a block diagram of an embodiment of a system for providing information to a customer in a retail store.

A system 100 for providing information of interest to a potential purchaser of products at a retail store is shown in FIG. 1A. In embodiments, the components of the system 100 are communicatively coupled to or in electrical communication with each other to provide the functions and services hereinafter described. In embodiments the retail store or site is the place of the actual point of purchase. The system 100 includes an RFID tag in proximity to or affixed to a product in the retail store. The RFID tag 102 communicates with a mobile device 104, also referred to as a "wireless kiosk." The one or more wireless kiosks 104 send information, such as the location of the customer to a wireless network access point 106 and on to an in-store information server 108. In embodiments, the information server 108 stores information, for example, the products purchased by a customer or the location or path of a customer, in a datastore 114. The information server 108, in embodiments, communicates through a network, e.g., the Internet 110 to a remote information network 112. The information network server 112, in embodiments, provides information to the information server 108 to be sent to one or more wireless kiosks 104. The information network server 112, in embodiments, stores information, in a datastore 116, for example, customer purchasing habits, performance of product information sent to the wireless kiosks or performance of retail stores. In other embodiments, the information network server 112 also communicates through a network 118, for example, the Internet, to sources of information, for example, product manufacturers or distributors 120. In other embodiments, portions of the system functions, hereinafter explained, are completed in locations other than those shown in FIG. 1A. For example, datastore 114 may not exist and datastore 116 stores all information. One skilled in the art will recognize other system configurations that are within the scope of the present invention as defined in the claims.

Figure 1B:
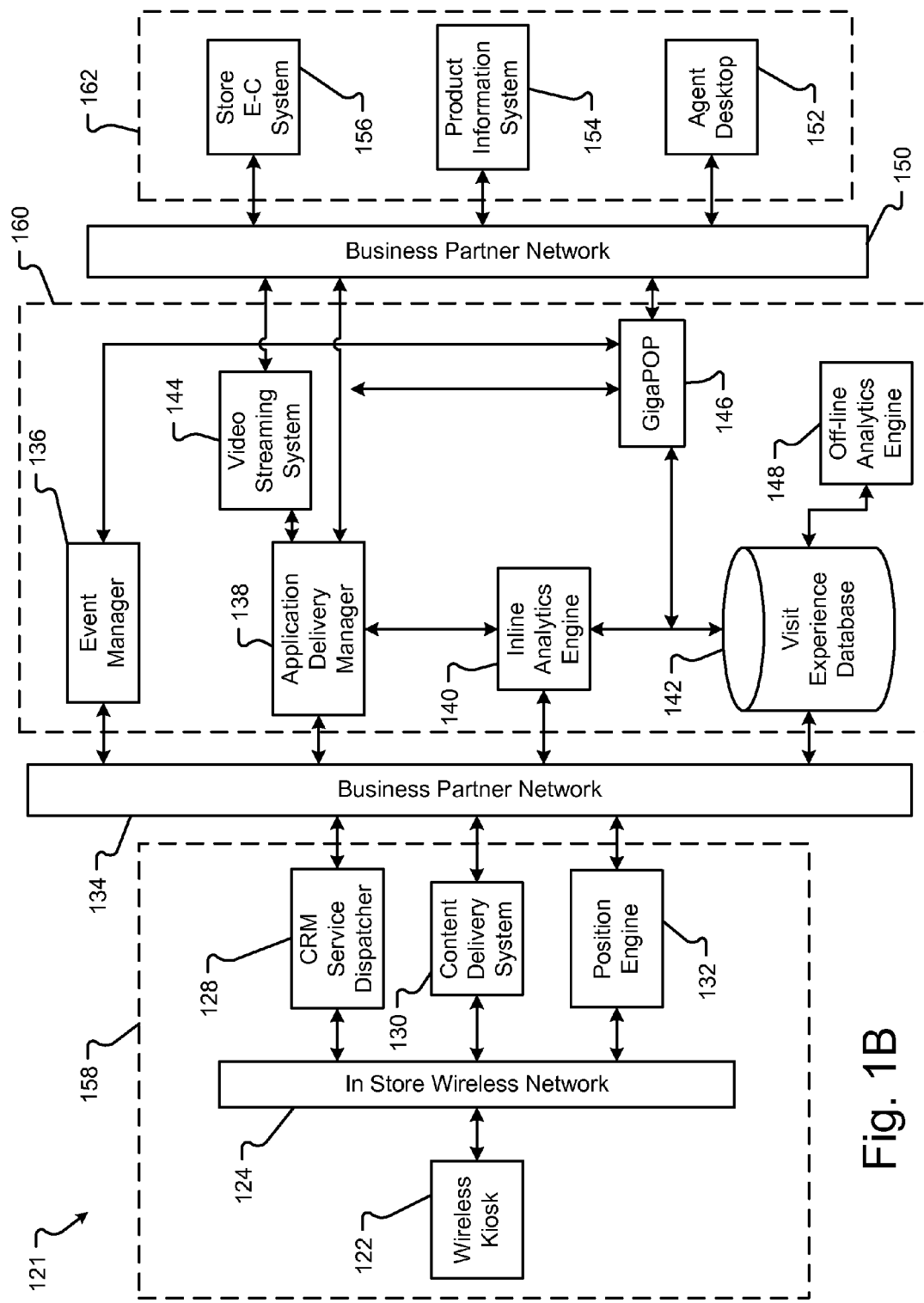
FIG. 1B is another block diagram of another embodiment of a system for providing information to a customer in a retail store.

Another embodiment of the virtual retail assistant system 121, hereinafter referred to as "VERA" or simply "system," is shown in FIG. 1B. For convenience in explaining the architecture, the equipment has been described in reference to its location, i.e., on the customer's premises or retail store 158; at a data center 160; or (3) at a location 162 other than the retail store 158 or the data center 160. It should be understood, however, that the location of equipment may vary and that the arrangement described in FIG. 1B is only one possible embodiment of the invention. In embodiments, the components of the system 121 are communicatively coupled to or in electrical communication with each other to provide the functions and services hereinafter described. In embodiments, the component and functions herein described are executed in hardware, software, or a combination of hardware and software.

The embodiments of the following component are located at the retailer's store, as represented by the dashed box 158, and are customer premise equipment (CPE). The wireless kiosk 122, similar to the wireless kiosk 104 (FIG. 1A), is a mobile device that the customer receives when he or she enters the store and uses throughout the shopping experience in the retail store. In one embodiment, the wireless kiosk 122 is attached to a shopping cart. The wireless kiosk 122, in embodiments, includes a display that allows for human and machine interactions, for example, with a pen-based or stylus data entry and a keypad. The wireless kiosk 122 may have various forms, may provide audio input and output, and may be outfitted with an earpiece with disposable foam ear covers. Thus, the wireless kiosk 122 provides a user interface for the customer to access his or her account information and the services provided by embodiments of the invention.

To use the wireless kiosk 122, the customer, in embodiments, inserts certain identifying information, for example, their login information for the loyalty club or their standard login for online shopping. In embodiments, using the wireless kiosk 122, the customer views product information, communicates with agents via voice over Internet protocol (VoIP), text chat, email or other technology. Customers, in further embodiments, use the wireless kiosk 122 to order products and services and to complete a purchase transaction. In one embodiment, the wireless kiosk 122 uses a headset for voice interactions and a screen and pen for data entry using electronic ink (e-Ink). An exemplary wireless kiosk platform 122 is the Cart Companion application offered by Cuesol, Inc. of Quincy, Mass.

In embodiments, the wireless kiosk 122 provides a screen that is easy for customers to see and use. As they walk through the aisles, customers get personalized marketing messages based on their shopping history, location, interactions with the wireless kiosk 122, referred to as the "click stream activity," or other information. Since the system 121 is location-based, the information is delivered to the customers at the time and location that the customers are currently located in time to make a purchasing decision. By offering shoppers personalized location-relevant offers, retailers benefit from immediate, in-store marketing to increase purchases. The wireless kiosk 122 also offers retailers a real-time solution to viewing store traffic, flow, and congestion. More information on the wireless kiosks and methods of RFID location is provided in U.S. patent application Ser. No. 11/533,231, entitled "Product Information Associated with Customer Location," assigned to the common assignee, TeleTech Holdings, Inc., the entire disclosure of this application is incorporated herein in its entirety for all that it teaches.

In embodiments, each wireless kiosk 122 includes a scanner (nor shown in FIG. 1B). The scanner, in embodiments, rests in a "cradle" attached to the shopping cart and is connected electronically to the wireless kiosk 122 through an extensible, e.g., coiled cord. The customer physically extends the scanner to a product of interest and scans the bar code or RFID tag associated with the product for identification. The information is automatically transmitted by the wireless kiosk 122 to the in-store wireless network 124 where the product information is used in various ways, for example, to predict customer interests, "push" pre-recorded manufacturer information regarding the product to the customer via the wireless kiosk 122, or to advise an expert agent about the product the customer is inquiring about. The product information is also stored in a visit experience database 142 for reference during this customer visit to the store or in later experiences with the retailer. In further embodiments, one or more printers (not shown in FIG. 1B) are located at one or more locations in the store that allow the system 121 to print out coupons desired, receipts, and other documents for retention or use in hardcopy format.

A customer relations management (CRM) service dispatcher 128, in embodiments, enables smooth service process orchestration. The CRM service dispatcher 128, in embodiments, enables the customer to call for in-store assistance through connections to those services. For example, when a customer is ready to check out, he or she uses the wireless kiosk 122 to arrange for payment, arrange to print the sales receipt, and initiate assistance through the CRM services dispatcher 128 to physically pull the product from inventory and have it delivered to the customer's vehicle. In further embodiments, disabled shoppers are able to call for special assistance when they need it, and the CRM service dispatcher 128 sends the help immediately or coordinates to have the help sent to the customer's location, which is known from the position engine 132.

The content delivery system 130, in embodiments, provides content to the customer in the appropriate format for the wireless kiosk 122. Among other things, embodiments of the content delivery system 130 aggregate, format, and deliver content, for example, full video feeds, to the wireless kiosk 122 or to a display screen in the pertinent aisle. The content delivery system 130 uses content from the retailer as well as richer product information that is available directly from the manufacturer.

In embodiments of the invention, the position engine 132 periodically determines or identifies the position or location of the customer in the store. As an example, the position engine 132 identifies the customer's location every second. The period for the position determination may vary from portions of a second to over a minute. In one embodiment, the position engine 132 uses a triangulation technique. For example, using signal strength measurements taken from at least three in-store wireless network access points in the in-store wireless network 124, the position engine 132 is able to triangulate the position of each wireless kiosk 122 or other mobile device and therefore know the location of each customer. Position data is sent to the event manager 136 to constantly update the system 121 on the customer's in-store location. More information on methods for in-store location is provided in U.S. patent application Ser. No. 11/533,231, entitled "Product Information Associated with Customer Location," assigned to the common assignee, TeleTech Holdings, Inc., the entire disclosure of this application is incorporated herein in its entirety for all that it teaches.

Embodiments of the invention use an in-store wireless network 124 as the network to communicatively couple or electrically communicate with all of the various in-store system components mentioned above. The in-store wireless network 124, in embodiments, provides the link with the wireless kiosk 122 and allows other related devices to communicate. In embodiments, the in-store wireless network 124, as installed at each store, is certified for quality of service to ensure that video streaming and agent interactions will be effective. In one embodiment, communication of data via the in-store wireless network 124 web interface will utilizes standard encryption such as SSL. Further, embodiments of the in-store wireless network 124 utilize standards, for example, WEP and WPA encryption schemes, to ensure secure over-the-air transmissions. Customer specific data, in embodiments, is secured via isolated databases with any necessary encryption, or is sent over dedicated connections to the customer data center 160 where the system 121 leverages existing data. Client hosted customer data, in embodiments, remains in the data center 160 and is protected by existing data security processes and policies. In embodiments, the in-store wireless network 124 is a 802.11a, 802.11b or 802.11g based technology as governed by the IEEE Standards Association (IEEE-SA) or, in alternative embodiments, other technology as the new generation of wireless networks are made available. In addition, embodiments of the in-store wireless network 124 are used to extract customer position information through "triangulation" technologies, for example, the system takes signal strength measurements between the wireless device and at least three access points in the store to calculate the position of the device and the customer. In one embodiment of the present invention, the in-store wireless network 124 is used to ensure that each wireless kiosk 122 does not leave the retail store. For example, an alarm is sounded at an appropriate location, for example, on the device itself or at a security checkpoint, if the location of the wireless kiosk 122 is detected outside certain boundaries.

In embodiments of the present invention, the business partner networks (BPN) 134 and/or 150 provide access between the retailer site 158 and the off-site data center 160 or other sites 162. The BPN 134 and/or 150 allow communication and information to span both the retailer's network(s) 158 and the data center 160, and other sites 162, such as a separate call center.

The following embodiments of the components or functions are physically located in the data center(s), as represented by the dashed box 160 in FIG. 1B. In an embodiment, the event manager 136 records events from multiple systems that are related to a customer's behavior. The event manager 136, in embodiments, provides event information to the inline analytics engine 140 or other components. In further embodiments, when a business rule must be activated, the event manager 136 activates the business rule. For example, if the customer's position is shown to stop for a period of time, such as 10 seconds, the event manager 136 recognizes an event. Marketing material for products in proximity to the customer's position can then be pushed to the customer for viewing.

The application delivery manager 138, in embodiments, is a transaction engine that coordinates the action in the system 121 with the required applications in the system 121. For example, when a customer scans a product and requests detailed product and pricing information, the applications delivery manager 138 accesses the appropriate systems to get the information and deliver it to a customer via the wireless kiosk 122. In embodiments, upon the identification of an event by the event manager 136, the event manager 136 instructs the application delivery manager 138 to deliver content or information to a customer. The application delivery manager 138, in embodiments, receives information or content from a video streaming system 144 or one or more other systems, such as the product information system 154 that is in electrical communication with the application delivery manager 138 through the BPN 150. In embodiments, the application delivery manager 138 instructs the content delivery system 130 on what content or information to provide to the wireless kiosk 122.

In an embodiment of the present invention, an inline analytics engine 140 is employed to provide real time system decisions that result from customers' behaviors. For the customer, results of the analytic functionality is provided to the wireless kiosk 122 in the form of recommendations and the prediction of certain actions, for example, the customer requires installation with the purchase of the "80211G Cisco" home networking product that the customer just purchased. Thus, upon recognition or the "installation business rule," the inline analytic engine 140 has the application delivery manager 138 instruct the CRM service dispatcher 128 to schedule the installation, or instructs the CRM service dispatcher 128 to schedule the installation. While a business process is occurring, the inline analytics engine 140, in embodiments, is able to process information and make decisions to improve the process for both the retailer and the customer according to one or more business rules stored and evaluated by the inline analytics engine 140.

Further embodiments of the system 121 provide an off-line analytics engine 148 that provides post-process analytics for strategic decision support. The off-line analytics engine 148, in embodiments, is used to spot and analyze trends in the business and observe customer events and behaviors in the retailer's store environment, e-commerce channels, and other points of customer contact. In embodiments, the off-line analytics engine 148 also helps to manage the business rules evaluated by the inline analytics engine 140.

The visitor experience database 142, in embodiments of the present invention, receives customer location and click stream behavior from the inline analytics engine 140, position engine 132, wireless kiosk 122, or other device or component. The visitor experience database 142 also receives interaction related data from the TELETECH GIGAPOP™ 146, for example, website activity from a particular customer, as described below. The data store in the visitor experience database is made available to a number of systems, including, but not limited to, the offline analytics engine 148 and inline analytics engine 140 to provide analysis of actions performed by the customer.

In an embodiment of the present invention, a video streaming system 144 provides the customer with video feeds for richer product information. In an example, the video streaming system 144 relies on high quality network to support quality of service ads that can provide detailed information to the wireless kiosk 122. A large amount of content, in embodiments, is provided through the manufacturer or a trusted third party source. For example, a video stream is sent to the wireless kiosk 122 from the video streaming system 144 through the application delivery manager 138 that provides how-to information or other content specific information, such as product specification, FAQs, installation, user documentation, etc.

The TELETECH GIGAPOP™ 146, in embodiments, is a centralized datacenter facility for contact center specific technology. TELETECH GIGAPOP™ 146 is offered by TeleTech Holdings, Inc., of Englewood, Colo. The TELETECH GIGAPOP™ 146 data center, in embodiments, provides hosted interaction management technologies, including, but not limited to, chat and web collaboration support for agents engaged in providing customer service and sales support to retail store customers. Also, embodiments of TELETECH GIGAPOP™ 146 include interaction disposition data collection, data warehousing, reporting, and related systems. In embodiments, the TELETECH GIGAPOP™ 146 system coordinates communication with the application deliver manager 138 and outside systems, represented by dashed box 162. In still further embodiments, the TELETECH GIGAPOP™ 146 system coordinates storage of customer interaction data into the visit experience database 142 that is generated from interactions outside the retail facility, such as on the retailer's or manufacturer's website.

The remaining components, in embodiments of the invention, are located separately from the data center 160 or retail store 158, as represented by dashed box 162, although some components could be located in the data center 160. In embodiments, the store ecommerce (E-C) system 156 provides order processing and CRM for one or more customers on a website. In further embodiments, the product information system 154 provides detailed product information, including, but not limited to, third party ratings and comparisons, complementary products and services, availability, and other product information. The product information, in embodiments, is drawn from retailer and external systems, such as the manufacturer. The agent desktop 152, in embodiments, manages the interaction flow by providing tools, information, and scripting to an expert agent to ensure that each customer interaction is handled professionally and expeditiously. The human, expert agent can be located in the data center 160 or in another party's facilities, such as those of the retailer.

Figure 2:
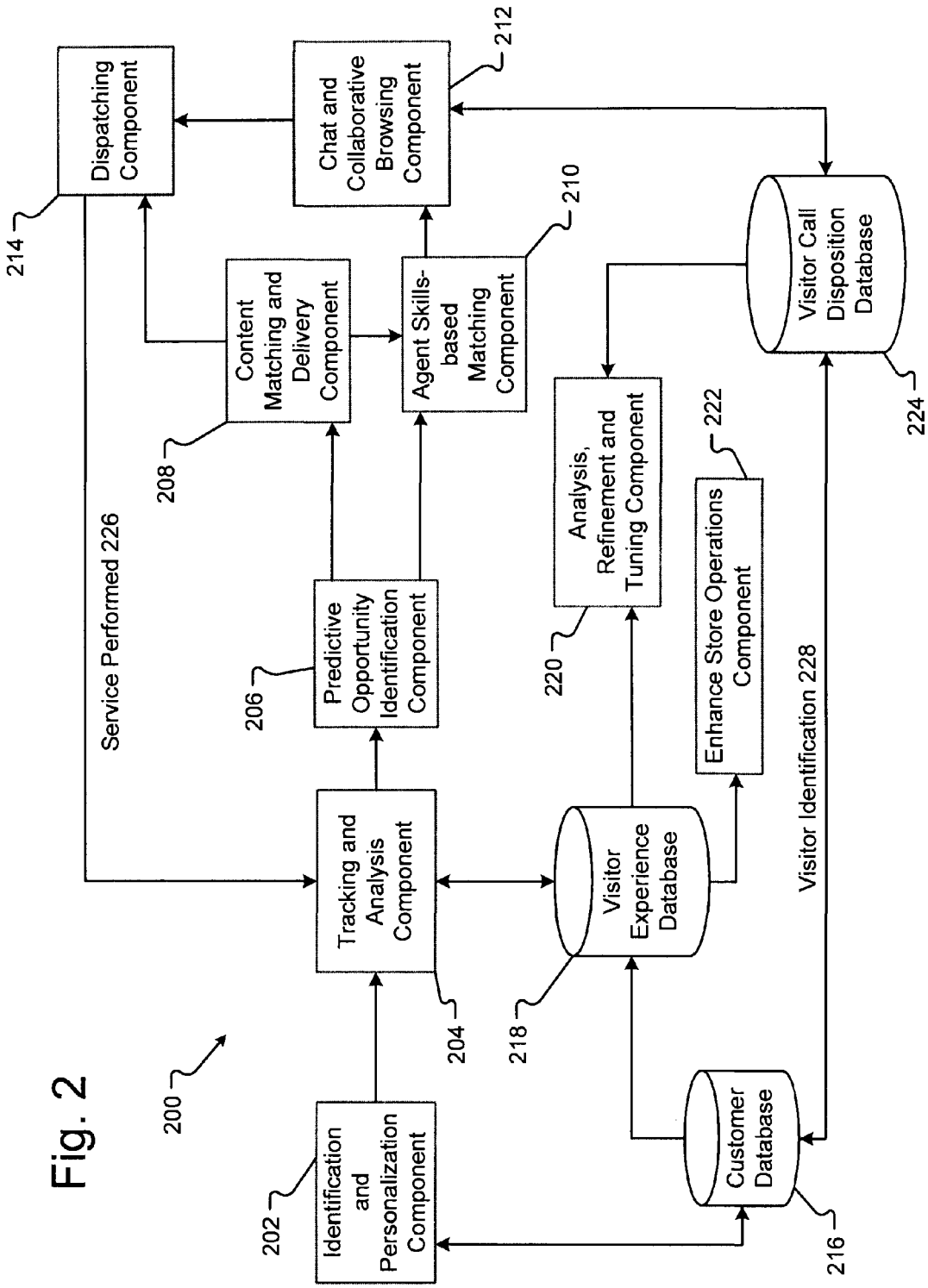
FIG. 2 is yet another block diagram of another embodiment of a system for providing information to a customer in a retail store.

Another embodiment of an information system 200 is shown in FIG. 2. The components or functions executed by the system 200 may executed in the retail store 158 (FIG. 1B), the data center 160 (FIG. 1B) or outside the data center 162 (FIG. 1B). In embodiments, the components are communicatively coupled to or in electrical communication with each other to provide the functions and services hereinafter described. A first component is the identification and personalization component 202. In one embodiment, an identification and personalization component 202 identifies individual customers and personalizes the shopping experience for each customer. The identification and personalization component 202, in an exemplary embodiment of the invention, identifies the customer by having the customer input information into the wireless kiosk 122 (FIG. 1B) after the customer enters the store and receives a wireless kiosk 122 (FIG. 1B). The customer is identified, in embodiments, by one or more items of unique identifying information that is sent through the wireless network and captured for authentication with information stored and/or retrieved from the customer database 216.

For example, the customer logs into the VERA system 200 through the wireless kiosk 122 (FIG. 1B). When first powered up, the device will register with the network and then launch a login screen for the user. The customer enters a user ID and password. The identification and personalization component 202 authenticates the customer and sends a communication to the tracking and analysis component 204 alerting the tracking and analysis component 204 of the new customer. The tracking and analysis component 204 begins to periodically determine and store the customer's position and to store all the customer's system-related behaviors, the click-stream activity, into a visitor experience database 218.

After the customer has been identified, embodiments of the identification and personalization component 202 query the retailer's customer database 216 to access customer profile information reflecting previous contacts between the customer and the retailer including, without limitation: inquiries and "shopping" on the retailer's web site; purchases (via Internet, retail store, catalogue and telephone) and customer service contacts. The profile is continually updated based on customer updates, purchase behaviors, and other relevant data through other contacts between the customer and the retailer. The system 200 can utilize this customer profile to assist the customer while he or she is in the store. In embodiments, the customer profile is used to customize the display of the wireless kiosk 122 (FIG. 1B) for the particular customer's needs.

In one example, the profile, including personal preferences of the customer, is used to personalize the user interface of the wireless kiosk. The profile includes information regarding personalization of the wireless kiosk display, sound levels for audio and defaults regarding the customer's desire to receive marketing, product, or sales information via the wireless kiosk while the customer is in the store. In further embodiments, the customer is allowed to opt-in and give permission to receive marketing offers each time the customer enters the store, the prior preferences of the customer with respect to those matters can be used as default settings for the interface.

In other embodiments, the visitor identification and profile 228 is made available to and assists the expert agent in responding to customer inquiries. For example, knowledge of the customer's ownership of other electronic products gives the agent insight into unexpressed issues inherent in a customer's inquiry, for example, issues of compatibility of peripherals or software. The agent is be able to consider those issues when providing information in response to the expressed inquiry of the customer or suggests additional or other products that solve those issues. Thus, a customer is prompted or reminded to purchase those products during the present trip to the retailer's store, rather than realizing the omission after leaving the store.

Other examples exist of how the customer profile is used in linking previous Internet activity with present in-store activities. If a customer had been shopping online with the retailer and had been making inquiries regarding specific products, where a promotion from the retailer is currently offered for the product, the system 200 extracts that information from the visitor experience database 218 and presents the customer with the promotional offer and the potential savings before the customer has left the store. Because the customer profile showed the customer had previously demonstrated an interest in the product, the system 200 makes a proactive contact with the customer to make certain they are aware of the promotional offer.

In still further embodiments, the profile is coupled with information about the customer's location in the store to send location-specific marketing material, such as information, coupons, sales advice, and other materials to the customer via the wireless kiosk. For example, advertisements sent to the wireless kiosk from manufacturers or the retailer are personalized based on the customer information and location. Information disseminated to and received from or about the customer via the wireless kiosk, while the customer is in the store, is used to update the profile. Another embodiment of the present invention allows the customer the option of selecting "self service" (i.e., the customer receives information only in response to customer initiated inquiries) or "assisted service" (i.e., information is "pushed" to the customer based on store location, customer profile and other predictive parameters). The customer may select whether he or she wishes to receive shopping assistance information by video, audio, data, or combination of methods.

The tracking and analysis component 204, in embodiments, periodically identifies and monitors the customer's location in the store and tracks system inquiries, storing this information in the "visitor experience database" (VED) 218. As the customer moves through the store and scans barcodes or triggers RFID sensors for product information, embodiments of the tracking and analysis component 204 record these events along with the customer's location in the store. Additionally, related systems can deposit event and transaction data, either current or historical data, into the VED 218 to further enrich the customer data. The VED 218 also integrates, in embodiments, prior events of relevance, such as customer Internet activity, because many customers begin their shopping experience online.

Real time analytics enables the retailer to evolve business rules dynamically, learning from the customers' patterns of behavior. Embodiments of the invention provide a predictive opportunity identification component 206 that anticipates logical next steps to transactions that have already started and help save time and steps for the customer. This improved efficiency is accomplished through tracking the location of a customer and monitoring scanned information so that the retailer, through the virtual sales agent, determines what the customer is currently attempting to do.

The predictive opportunity identification component 206, in embodiments, by using customer-defined preferences, retailer-defined business rules and in-store location information, is able to predict purchase behavior and potential attractiveness of offers to the customer. Business rules, in embodiments, are constantly improved through an inline analytics engine 140 (FIG. 1B), within the predictive opportunity identification component 206, which observes real behaviors and evolves the business rules to match. A business rules engine, also within the predictive opportunity identification component 206, governs actions through the use of "if-then" logic, where, when an action is detected, the business rules engine is able to take action based on instructions that are pre-programmed into it. For example, when a business rule is written, the predictive opportunity identification component 206 is able to offer a list of other products that are commonly purchased with the first product if a customer makes an inquiry regarding a specific product.

The "in-line" business rule engine, included within the predictive opportunity identification component 206 shown in FIG. 2, is, in embodiments, an event based processing engine. The events are collected via the event manager 136 (FIG. 1B). In one embodiment, the in-line business rule engine is aware of different context perspectives (semantic, temporal, spatial, and state) of the shopper and detects event situations where a reaction is warranted. In other words, the in-line business rule engine is a "one-on-one in-line solicitation engine." Beyond the solicitation, the business rule engine also provides business process management, such as on-boarding or off-boarding of dealers, agents or technology subscribers and business activity monitoring, such as operation dashboards.

Further embodiments of the present invention include a content matching service 208, which drives the delivery of relevant content based on actions that the customer is taking, the customer's location in the store, the customer's personal preferences, and other marketing data. Thus, when a customer stops at a location in the store, relevant product offerings, sales information, coupons, etc., are disseminated to the customer via the wireless kiosk. The customer views the content presented on the screen of the wireless kiosk or on a display screen located nearby. Content is available in rich video feeds, through the smart cart screen, or in various other forms of media and types of delivery. The content may include, but is not limited to, the retailer's own content, product information from the manufacturer(s) or content from other related sources. As noted previously, the customer may elect whether it wants to receive this type of information while shopping or proceed "unassisted," unless the customer solicits information from an agent or other available resource. Even if the customer elects to proceed "unassisted," the content matching service 208, in embodiments, provides audio and/or visual "prompts" via the wireless kiosk reminding the customer of the types of information that could be accessed regarding products that the customer appears to be interested in. The customer then selects information of interest, notwithstanding having previously "opted out" of the assisted shopping features.

Embodiments of the present invention include expert retail assistants (agents), which are a pool of highly skilled and trained people that are available to customers to support sales, customer service, technical support, and loyalty program needs. In one embodiment, agents are placed into skill groups and are trained on specific product knowledge with access to detailed product information and an agent product lab. Skill groups cover distinct product categories, and agents become experts on each product category, allowing them to become adept at high-end customer care management.

Agents, in embodiments, are matched to a customer inquiry through an agent skills-based matching component 210. In embodiments, based on customer location and other business/profile parameters, the agent skills-based matching component 210 determines what agent to connect with a customer and communicates with the chat and collaborative browsing component 212 to connect the customer with the agent. The chat and collaborative browsing component 212 allows the agent to communicate with the customer to provide proactive support from the agent, provided the customer has not opted out of receiving such information. For example, the agent skills-based matching component 210 initiates a customer contact from a currently unutilized agent because the customer has paused at a given location in a store for a period of time exceeding a threshold level. The chat and collaborative browsing component 212 connects the agent with the wireless kiosk to allow the agent to inquire whether the customer needs assistance or to proactively send product information, using the dispatching component 214, which is similar to the application deliver manager 138 (FIG. 1B), relevant to the customer's current location in the store.

Agents, in embodiments of the invention, are "experts" in the numerous products available in the retailer's location, in the sense that each agent has expertise far superior to that of an average retail store assistant at the present time. To facilitate the agent's interaction, embodiments of the present invention include agent product labs (i.e., agent training) in which information for all products for sale that are supported by the retailer is located. The agents gain first-hand "touch and feel" experience with these products enabling them to be far better informed and able to provide advice and information. Training including, for example, operating demonstrations and live or videotape presentations from the manufacturer are enabled by the manufacturer(s). Thus, agents will have access to all products that are for sale by the retailer or for which the agent offers expertise. This training enables the agents to have "hands-on" experience to better enable them to trouble shoot problems and answer questions.

In one embodiment of the present invention, a manufacturers' portal, which is a link between the customer and the manufacturer of each product, is also provided and managed with the chat and collaborative browsing component 212. The product suppliers provide, i.e., "load," updated product information on this portal. This information may be: (a) accessed directly by customers upon inquiry from the customer; (b) accessed by agents in training or in responding to specific customer inquiries; (c) "linked" or played for customers by an agent in response to an inquiry from the customer, and/or (d) "pushed" to a customer—who has not opted out of such marketing information—based on the location of the customer in the store. Thus, in embodiments, customers have access to the most accurate and up to date product information available from the manufacturer. Content is available online either through the wireless kiosk and/or, in other embodiments, through one or more "high-end" video stations located throughout a store from which high definition monitors deliver robust content on demand from the customer or an agent. The product information, in embodiments, is indexed so that the customer conveniently identifies and accesses a specific portion of the presentation pertinent to the customer's interests or questions. In one embodiment of the invention, a customer's inquiry regarding a product is first addressed by transmitting the programmed material to the customer's wireless kiosk, with the customer having the capability of "opting out" of that format to access a live expert assistant. Data about the calls between the agents and the customer is stored in a visitor call disposition database 224.

Communications between customers and agents are effected through the wireless kiosk. In embodiments, the chat and collaborative browsing component 212 facilitates the customer's ability to call or "chat" (i.e., electronic written communication) with an agent using the wireless kiosk. Collaborative browsing allows the agent to push web pages to the customer to make sure that both the customer and the agent are looking at the same material. The chat and collaborative browsing component 212 in further embodiments detects the times when a customer needs to be approached, and be automatically presented with information based on the behavior of the customer. Staffing of agents is managed closely to match the traffic flows of each retailer location. This improved staffing enables the retailer to ensure that sufficient staff is available so that they are not overwhelmed and that customers have access to agents when they need expert assistance. Weekends and evenings are the times that retailers are traditionally the busiest.

Embodiments of the invention provide analysis tools that help improve the VERA functionality after the customer's visit. One embodiment of the present invention includes an analysis, refinement and tuning component 220 that employs workforce management technologies that collect and monitor historical patterns in customer traffic to ensure full staffing when it is required and reduced staffing when it is not required. The analysis, refinement and tuning component 220, in other embodiments, is used to determine and employed to assist stores with staffing for "peak" traffic on weekends and evenings when the stores are most busy. While retail employees are present to handle some customer needs they can direct some customer inquiries, especially those involving more detailed knowledge of a product, to an agent with the appropriate expertise.

In another embodiment, an enhance store operations component 222 provides analysis of business rules or business operations within the retail store. For example, the flow of customers is evaluated over a period of time to maximize exposure of certain products. The enhance store operations component 222 extracts customer visit data for one or more customers from the VED 218. By statistically analyzing the data, the enhance store operations component can provide information on how to improve the experience of future customers in the retail store.

Embodiments of the present invention also includes a number of key features relating to automated and personalized interaction with the customer in the store. For example, the system 200 utilizes real time analytics that are driven by location information, stored customer data, and pre-defined business rules to make decisions and to provide the customer with information and relevant product offers. In one embodiment, the dispatching component 214 works via in-store or remote CRM services to complete the in-store shopping experience. The dispatching component 214, in embodiments, is coupled to the point of sale systems to allow the dispatching component 214 to locate product ordered by customer, arrange shipping or pick-up by customer and arrange for any required service calls. The service performed 226 is sent, in embodiments, to the tracking and analysis component 204 to record the customer's in-store experience in the visitor experience database 218.

Figure 3:
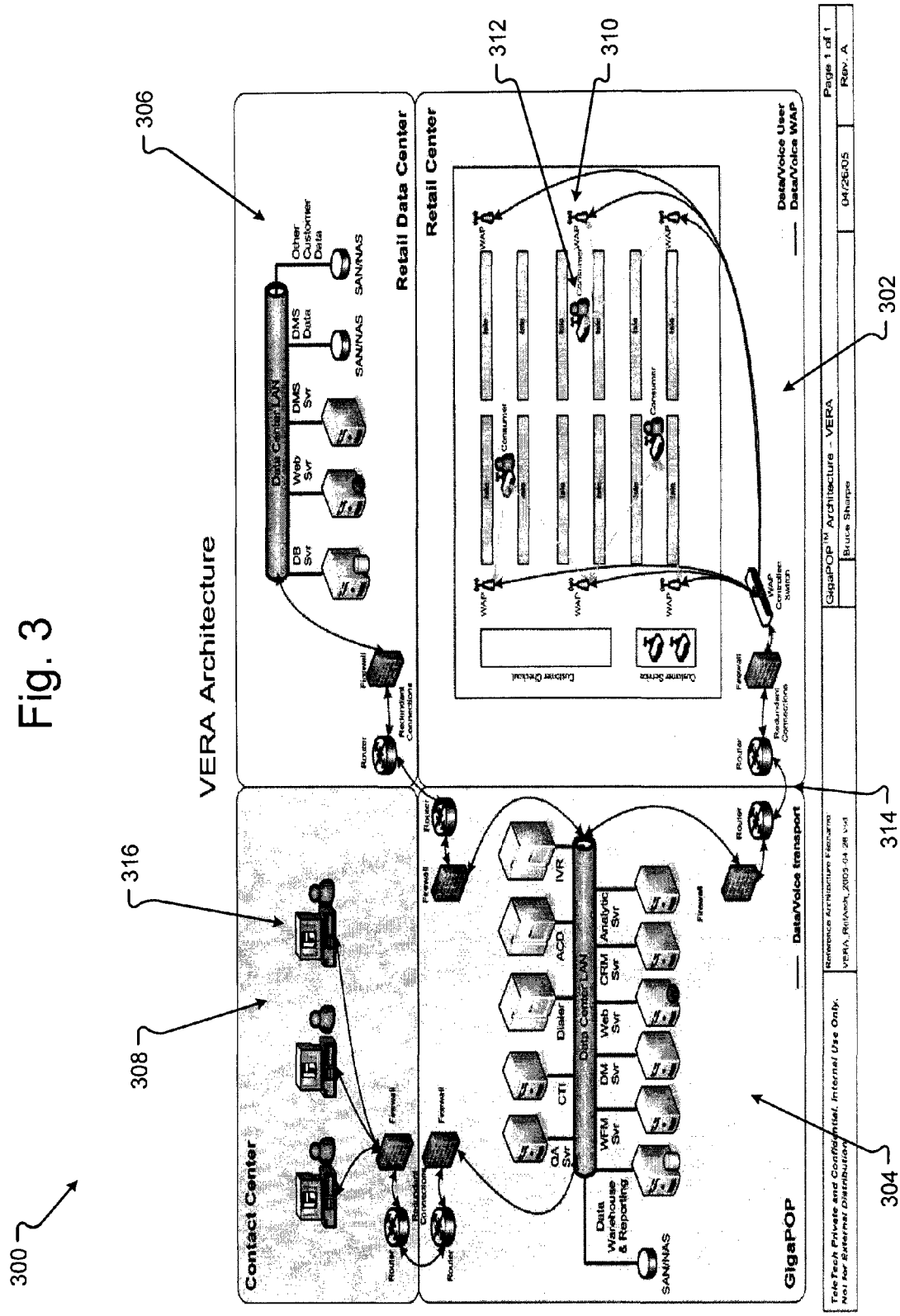
FIG. 3 is a computer architecture drawing of an embodiment of the physical connectivity between a retail store, data center, contact center, and the retailer's data center.

An exemplary embodiment of a hardware architecture 300 for the VERA system is shown in FIG. 3. The retail store system 302 includes one or more wireless connection points 310 interspersed around the aisles of the store. A customer with a wireless kiosk 312 connects, in embodiments, to the wireless network and, thus, to the VERA system. A network connection 314 is made between the network of the retail store 302 and the data center 304. The data center 304, in embodiments, includes the systems and components described in connection with FIG. 1A, FIG. 1B and FIG. 2. The data center 304 has further network connections to a contact center 308 in which agents 316 are available to be connected with the wireless kiosk 312 to allow for assistance of the customer. In other embodiments, the data center 304 is connected with a retail store data center 306. More information about the data center 304 is provided in U.S. provisional patent application 60/733,051, entitled "Shared Call Center Systems and Methods," having a filing date of Nov. 2, 2005, commonly assigned to TeleTech Holdings, Inc., the entire disclosure of this application is incorporated by reference herein for all that it teaches. The retail store data center 306, in embodiments, also includes components or performs functions described in connections with FIG. 1A, FIG. 1B and FIG. 2. In an alternate embodiment, the retail store network 302 connects with the retail store data center 306, which relays communications to the data center 304. One skilled in the art will understand the interconnections and network topology for the VERA system 300 shown in FIG. 3.

Figure 4:
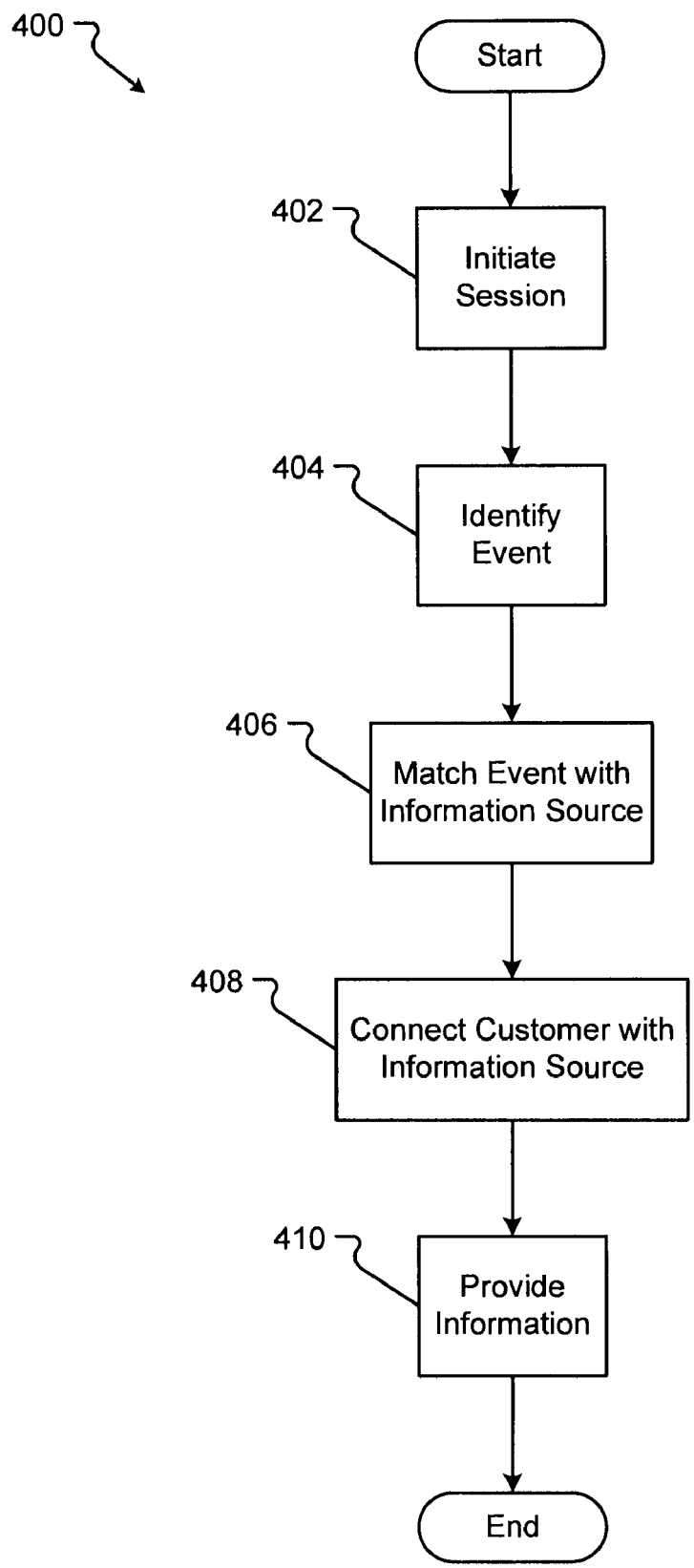
FIG. 4 is a flow diagram representing an embodiment of a method for providing information to a customer in a retail store.

An exemplary embodiment of a method 400 for providing information using the VERA system is shown in FIG. 4. Initiate operation 402 initiates a session with a customer. In embodiments, a customer receives a wireless kiosk 122 (FIG. 1B) and is identified by an identification and personalization component 202 (FIG. 2). The identification and personalization component 202 (FIG. 2), in embodiments, logs the customer on using identifying information stored in a customer database 216 (FIG. 2), for example, the customer's loyalty account information. Upon identifying the customer, a tracking and analysis component 204 (FIG. 2), in embodiments, begins storing location and other information into a visitor experience database 218 (FIG. 2) and providing the information to a predictive opportunity identification component 206 (FIG. 2).

Identify operation 404 identifies an event. In embodiments, an event management component 136 (FIG. 1B) determines when an event occurs. For example, if a customer stops in a section of the store for more than a predetermined amount of time, such as 10 seconds, the event management component 136 (FIG. 1B) determines that the customer is interested in one or more products in that section of the retail store. The predictive opportunity identification component 206 (FIG. 2), in embodiments, sends the determined event to a content matching and delivery component 208 (FIG. 2) and/or to an agent skills-based matching component 210 (FIG. 2).

Matching operation 406 matches the event with an information source. In embodiments, a content matching and delivery component 208 (FIG. 2) and/or to an agent skills-based matching component 210 (FIG. 2) matches the event to a type and/or source of information. For example, if the customer has stopped for a predetermined amount of time in a section of the retail store, the content matching and delivery component 208 (FIG. 2) determines that the information to be provided is marketing and sales offers for the products in that section of the store. The content matching and delivery component 208 (FIG. 2) matches the information to the event. In contrast, if the customer has scanned a barcode or RFID tag and has asked to information on the product, the agent skills-based matching component 210 (FIG. 2) determines that the customer needs to speak or interact with a trained agent.

Connect operation 408 connects the customer with the information source. In embodiments, the content matching and delivery component 208 (FIG. 2) collects the marketing or "electronic information" and creates a connection from the information source, for example, a manufacturers marketing database or website, to the wireless kiosk 122 (FIG. 1B). In another embodiment, after the agent skills-based matching component 210 (FIG. 2) determines that the customer needs to speak or interact with a trained agent and identifies which agent or type of agent, a chat and collaborative browsing component 212 (FIG. 2) creates a network connection between the agent 316 (FIG. 3) at the agent contact center 308 (FIG. 3) with the wireless kiosk 312 (FIG. 3) at the retail store 302 (FIG. 3).

Provide operation 410 provides the information to the customer. In one embodiment, the information collected by the content matching and delivery component 208 (FIG. 2) is sent to an application delivery manager 138 (FIG. 1B) to be pushed to the customer. For example, coupons or other marketing information is pushed to the wireless kiosk 122 (FIG. 1B) and displayed on the display of the wireless kiosk 122 (FIG. 1B). In another embodiment, the customer requires installation information and the content matching and delivery component 208 (FIG. 2) finds an installation video, which is streamed from the video streaming system 144 (FIG. 1B) to the wireless kiosk 122 (FIG. 1B). The chat and collaborative browsing component 212 (FIG. 2), in another embodiment, allows the agent to talk or browse with the customer using the wireless kiosk 122 (FIG. 1B) to provide interactive discussions of the product desired or service needed. In still another embodiment, the customer requests checkout and the dispatching component 214 (FIG. 2) sends a request to stock personnel to pull the product from inventory for delivery to the customer.

A further example of the function of the VERA system and service is described hereinafter to better elucidate how the VERA system operates in a retail environment. Shoppers registered to the store loyalty program arrive and check out a VERA mobile kiosk from a service desk at the entrance. A customer logs in by scanning his patronage card with the bar code scanner. Alternatively, the customer logs in using his or her name and password.

VERA responds by presenting previous purchase information, selected store specials and line items from the customer's saved "shopping cart" on the retailer's web site. Additionally, VERA renders the customer's relative location on a store map along with the locations of the "shopping cart" products. In this case, the customer's shopping cart contains a 52" widescreen high-definition television.

The customer moves toward the home electronics section and approaches the DVD player display. VERA responds by updating the customer's position on the map. When the customer stops in proximity of the DVD player display, VERA reads the passive RFID shelf tags and transmits that information to the event manager 136 (FIG. 1B). The event manager 136 (FIG. 1B) identifies the product type as "DVD Players" through the point-of-sale interface with the position engine 132 (FIG. 1B).

With the customer showing interest in wide-screen televisions and DVD players, VERA recognizes the retailer's business rule event trigger and subsequently pushes product information for media centers to the mobile kiosk. VERA also displays an icon on the store map indicating the location of media center personal computers.

The customer notices the media center products listed on a kiosk window, scrolls through the product listing and reads a few product descriptions. However, the customer has little knowledge of media center personal computers and understands little of the personal computer's applicability. The customer notices the "Get Help" button on the display and presses the button.

VERA immediately notifies the customer to put on the kiosk-attached bluetooth earpiece headset, pushes relevant customer interaction details into the visit experience database 142 (FIG. 1B), and initiates a VoIP call to a contact center, passing it a "key" to the interaction details in the database 142 (FIG. 1B).

The contact center receives the call in TELETECH GIGAPOP™ 146 (FIG. 1B) and routes the call to an agent queue that is trained in home theatre devices, including media center personal computers. An agent receives the call and, using the "key", acquires the relevant customer information and interaction details from the database 142 (FIG. 1B). The agent desktop 152 (FIG. 1B) uses the visitor experience database 142 (FIG. 1B) to identify the high-definition television (HDTV) and media center products of interest and immediately looks up product information from the retailer's database. The agent desktop 152 (FIG. 1B) also knows to search the manufacturer's system for extended product information, feature highlights, and cross-sell opportunities.

The agent learns that the customer was considering a HDTV and a DVD Player purchase when the mobile kiosk popped up media center products. The agent gives a short explanation of media center personal computers and takes the opportunity to learn more from the customer, such as spending limit, other multimedia devices owned, personal preferences, and other relevant information. Using these parameters, the agent searches the retailer's product catalog for an HDTV/media center combination that best fits the customer's preferences.

Once compiled, the list is pushed to the customer's mobile kiosk for a collaborative review with the agent. The agent points out key product features (supplied by the manufacturer) as he or she collaboratively works down the list with the customer. Once an acceptable combination is found, the agent uses the agent desktop 152 (FIG. 1B) to push the new product information to the mobile kiosk. VERA responds by updating the site map with the location of the new products.

Before terminating the call, the agent notices a manufacturer recommendation for an "Extender Set-Top Box" that will allow the customer to access media center content from their new television. She or he pushes this information and a list of recommended accessories to the mobile kiosk. VERA recognizes the new products and updates the display with relevant retailer and manufacturer incentives. Then, the call is terminated and the customer proceeds to pick up his products and check-out at the point-of-sale.

Thus, embodiments of the invention solve the "customer issues" as follows:

| Customer Issue | Solution via the Present Invention |
|---|---|
| Customer is not able to get help when needed. | The invention offers instant access to assistance when the customer needs it. The invention also detects when a customer is experiencing trouble or may need assistance with a next step. If a customer is not in the correct location of the product they are seeking information for, the invention would sense their location and make a polite inquiry as to whether or not they need assistance. The invention will sense a delay in the time from the request for a product location and their arrival in that location. Based on this information and business |

-continued

| Customer Issue | Solution via the Present Invention |
|---|---|
| | rules written to govern this activity, the invention would be able to contact the customer proactively to determine if they need assistance. |
| Retailer's staff is not knowledgeable. | The invention provides highly qualified customer service and sales staff as well as product information from manufacturers and third parties. These third parties can include sources such as Consumer Reports, MSN ® Shopping, and other organizations that may or may not have an affiliation with the retailer. |
| Customer makes purchase decisions in a knowledge vacuum. | The invention provides rich information to the customer through video feeds, online documents and access to qualified agents |
| Customer cannot locate the product in-store | The invention can help the customer locate product in the store by understanding the customer's location information. The invention will include a map of inventory locations that is updated by the retailer. Based on this information, the invention is then able to determine the customer's position relative to position of the desired product. VERA can also send a map of the store with a mark to indicate the location of the product and a mark to indicate the customer's position. In the event that product is not in stock, the CRM services dispatcher can determine if product is available and arrange for shipment/delivery. The CRM services dispatcher is technology that would interface with the retailer's internal systems and place a request for this product to be delivered. |
| Customer's online shopping experience is disconnected from the in-store experience. | The invention ties together the customer's personal account and rewards programs with the in-store trips. The customer is instantly recognized and information provided in the store can be tailored to the customer's history/profile. In addition, any previous actions that may be saved in the customer's account can be re-engaged and completed in the store. Conversely, the customer's experience in the store can be saved to the same historical database so that information on the retailer's Internet site can be tailored for the customer and transactions can be re-engaged and completed by the Internet. |

Similarly, embodiments of the invention solve the "retailer issues" as follows:

| Retailer Issue | Solution via the Present Invention |
|---|---|
| Retailer's employee attrition is high. | The invention provides access to highly skilled and knowledgeable sales and customer service agents in one central location where training and high quality tools are provided. (If a video is available, the agent would stream the video to the customer.) |
| Training costs are high. With high employee attrition, retraining can be expensive. Additionally, the large amount of products and services makes it difficult for the most skilled in-store staff to maintain high levels of product knowledge. | The invention provides agents who are located in a "call center" facility and are hired based on required skills. Agents are provided ongoing training and have a number of tools that provide product information. These tools would include any of the existing systems that are in place for the retailer to capture and provide product information. These tools can also include a knowledge database that would be built and used to track relevant product |

-continued

| Retailer Issue | Solution via the Present Invention |
|---|---|
| | information. |
| Product training for staff is ineffective. | The invention always places well-trained, properly skilled agents "in front of" the customer. |
| Customers are often better informed than the sales staff. | The invention solves the unskilled sales staff problem by providing instant access to appropriately skilled agents ready to help with questions or process sales. Agents are also able to process a sale in the store and arrange for shipment to the customer location. Agents can also process sales where the customer is then able to proceed to an expedited check-out line or will call station to pick up their merchandise. |
| Lost sales opportunities. | The invention provides information so that the customer does not leave the retailer's premises without completing a transaction because it didn't have enough information. In addition, the invention employs inline analytics and business rules to make sure the retailer captures "up sell" and "cross sell" opportunities. |
| Retailer does not know when its most valuable customers are in the store. | The invention instantly identifies high value customers when they activate the wireless kiosk. When a high value customer is identified, they can be targeted for concierge service by in-store personnel. High value customers can also receive special "members-only" offers that apply to in-store offers and only they would be able to receive them. Once a high value customer is identified, the invention is able to target them for special treatment to ensure that they receive the best possible treatment when they are in the store. |

In summary, embodiments of the present invention provide an advanced retail solution that provides easily accessible product information to the retail customer, helps the retailer cater to the customer's individual needs and preferences and works to build long term customer satisfaction and loyalty. Embodiments of the invention use a system of in-store location information, business rules and in-line analytics to provide a collaborative retail CRM solution. Using a wireless kiosk, retail customers gain access to powerful product information and attachment to their own loyalty and rewards programs offered through the retailer. When a retail customer needs to check on product performance and comparisons, compatibility with other products and services, availability, and complementary items, he or she can use the wireless kiosk to establish this link with the retailer. The retailer benefits through improved "cross selling" and "up selling" and improved customer loyalty and satisfaction. As a result, embodiments of the invention improve sales at locations employing this technology.

Figure 5:
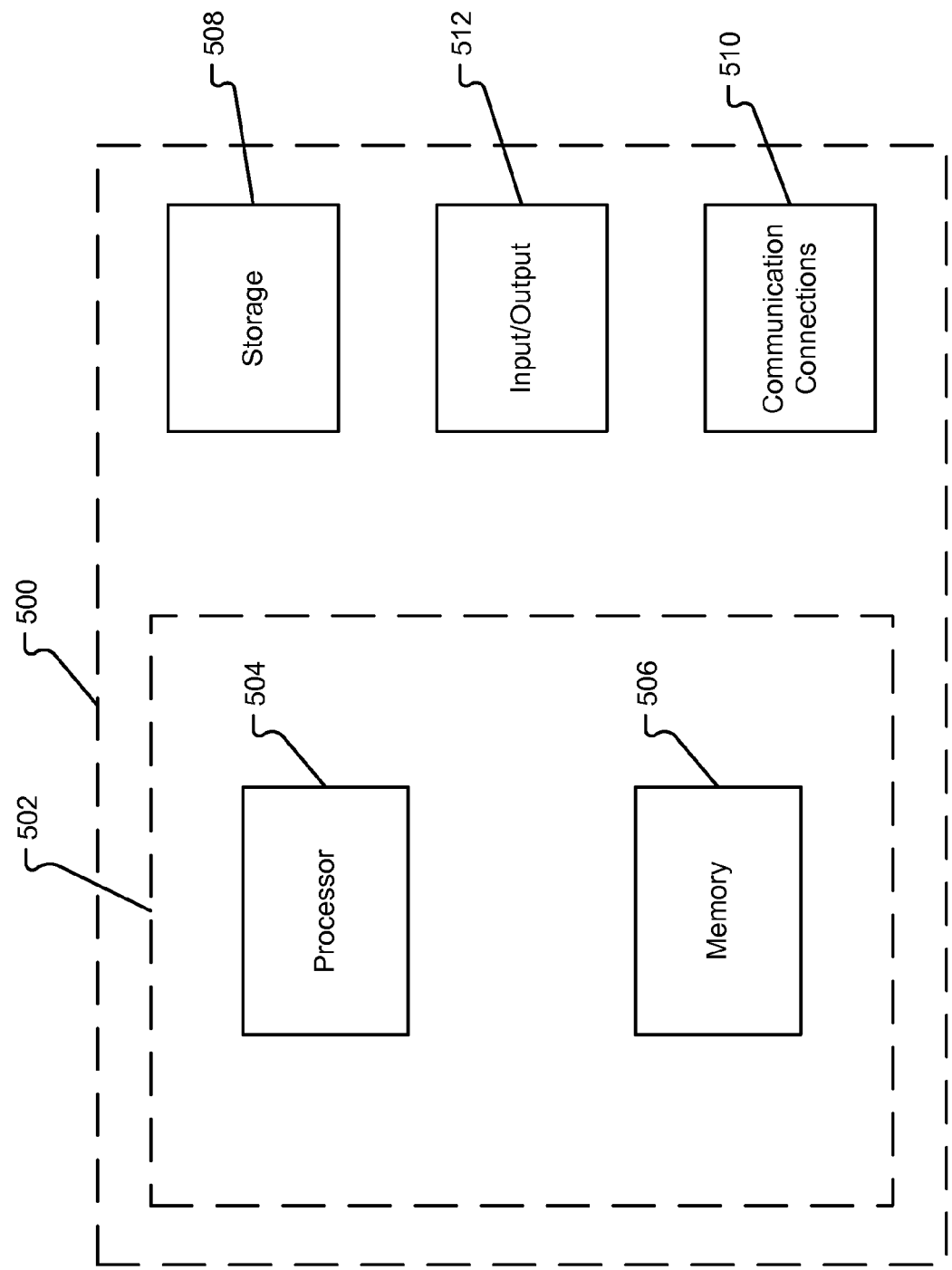
FIG. 5 is a functional diagram illustrating a computer environment and computer system operable to provide information to a customer in a retail store.

With reference to FIG. 5, an embodiment of a computing environment for implementing the embodiments described herein includes a computer system, such as computer system 500. Any and all components of the VERA system may execute as or on a client computer system, a server computer system, a combination of client and server computer systems, a handheld device, and other possible computing environments. As such, a basic computer system applicable to all these environments is described hereinafter.

In its most basic configuration, computer system 500 comprises at least one processing unit or processor 504 and system memory 506. The most basic configuration of the computer system 500 is illustrated in FIG. 5 by dashed line 502. In embodiments, one or more component of the VERA system are loaded into memory 506 and executed by the processing unit 504 from system memory 506. Depending on the exact configuration and type of computer system 500, memory 506 may be volatile (such as RAM), non-volatile (such as ROM, flash memory, etc.), or some combination of the two.

Additionally, computing device 500 may also have additional features/functionality. For example, computing device 500 includes additional storage 508, such as removable and/or non-removable storage, including, but not limited to, magnetic or optical disks or tape. In embodiments, software or executable code and any data used for the VERA system is permanently stored in storage 508. Computer storage media 508 includes volatile and nonvolatile, removable and non-removable media implemented in any method or technology for storage of information such as computer readable instructions, data structures, program modules, or other data.

Memory 506 and storage 508 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information, such as VERA component or data, and which is accessed by computing device 500 and processor 504. Any such computer storage media may be part of computing device 500.

Computing device 500 may also contain communications connection(s) 510 that allow the device to communicate with other devices. In embodiments, the communication connections 510 are used to connect customer with information over the VERA systems and networks, such as the Internet, that receives customer requests or events, and that sends information back to wireless kiosk used by the customer. Communications connection(s) 510 is an example of communication media. Communication media may embody a modulated data signal, such as a carrier wave or other transport mechanism and includes any information delivery media, which may embody computer readable instructions, data structures, program modules, or other data in a modulated the data signal. The term "modulated data signal" means a signal that has one or more of its characteristics set or changed in such a manner as to encode information in the data signal. By way of example, and not limitation, communication media includes wired media such as a wired network or direct-wired connection, and wireless media such as acoustic, RF, infrared, and other wireless media.

In embodiments, computing device 500 also includes input and output connections, interfaces and peripheral devices 512, such as a graphical user interface. Requests from customers are selected with user input device(s) 512, and the information returned is displayed with output device(s) 512. Input device(s) 512 are also referred to as user interface selection devices and include, but are not limited to, a keyboard, a mouse, a pen, a voice input device, a touch input device, etc. Output device(s) 512 are also referred to as displays and include, but are not limited to, cathode ray tube displays, plasma screen displays, liquid crystal screen displays, speakers, printers, etc. These devices, either individually or in combination, form the Input/Output 512 used to display the information as described herein. All these devices are well known in the art and need not be discussed at length here.

Computer system 500 may also include at least some form of computer readable media, which is some form of computer readable medium. Computer readable media can be any available media that can be accessed by processing unit 504. By way of example, and not limitation, computer readable media comprise computer storage media and communication media. VERA components comprise such modules or instructions executable by computer system 500 that may be stored on computer storage medium and other tangible mediums and transmitted in communication media. Computer storage media includes volatile and nonvolatile, removable and non-removable media implemented in any method or technology for storage of information such as computer readable instructions, data structures, program modules, or other data. Combinations of the any of the above should also be included within the scope of computer readable media. In some embodiments, computer system 500 is part of a network that stores data in remote storage media for use by the computing system 500. In embodiments, VERA components executing on a client system may receive data from or store data to remotely databases.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present invention. Therefore, the specific structure, acts, or media are disclosed only as illustrative embodiments. The invention is defined by the appended claims.

What is claimed is:

1. An information system for providing event relevant information to a customer in a retail store, the information system comprising:
   a wireless kiosk;
   a position engine in electrical communication with the wireless kiosk, the position engine periodically determining the location of the wireless kiosk in the retail store;
   an event management component in electrical communication with the position engine and the wireless kiosk, the event management component operable to identify an event from information received from the wireless kiosk or the position engine:
   a content delivery system in electrical communication with the wireless kiosk, the content delivery system operable to provide information to the customer on the wireless kiosk associated with the event identified by the event management component;
   an application delivery manager in electrical communication with the content delivery system, the application delivery manager operable to obtain the information provided to the customer;
   a business partner network in electrical communication with the application delivery manager;
   a store ecommerce system in electrical communication with the business partner network, the store ecommerce system operable to provide information about online interactions with the customer at a manufacturer's website to the application delivery manager;
   a product information system in electrical communication with the business partner network, the product information system operable to provide product information from a manufacturer to the application delivery manager; and
   an agent desktop in electrical communication with the business partner network, the agent desktop operable to provide information from an agent to the application delivery manager.

2. The information system defined claim 1, further comprising a video streaming system in electrical communication with the application delivery manager, the video streaming system operable to stream video to the application delivery manager.

3. The information system defined in claim 1, further comprising a visitor experience database in electrical communication with the wireless kiosk, the visitor experience database operable to store information associated with one or more customer visits for one or more customers.

4. The information system defined in claim 3, further comprising an inline analytics engine in electrical communication with the wireless kiosk, the inline analytics engine operable to evaluate one or more of a position of a customer, bit stream activity of the customer on the wireless kiosk, or information stored in the visit experience database against one or more business rules, the inline analytics engine to identify an event based on the evaluation against the one or more business rules.

5. The information system defined in claim 3, further comprising an off-line analytics engine in electrical communication with the visit experience database, the off-line analytics engine operable to evaluate information stored in the visit experience database and modify one or more business rules evaluated by an inline analytics engine.

6. The information system defined in claim 1, wherein the wireless kiosk comprises:
an input device operable to allow the customer input requests;
a communication device in electrical communication with the input device, the communication device operable to transmit the input requests and to transmit and receive voice communications with a remote specialized sales agent; and
an output device in electrical communication with the communication device, the output device operable to display product information receive from the remote specialized agent.

7. The information system defined in claim 6, further comprising a scanner in electrical communication with the communication device, the scanner operable to means for scan information associated with a product and to transmit that information to the communication device.

8. An automated method for assisting a customer in a retail store, comprising: initiating an information session with the customer; periodically identifying the customer's position in the retail store; identifying a product of interest to the customer based on the customer's position; and communicating information to the customer based on one or more of identified information regarding the customer, the customer's position or movement from in the retail store or the identity of the product, communicating the information provided to the customer via an application delivery manager in electrical communication with a content delivery system, communicating with a business partner network in the electrical communication the application delivery manager; communicating with a store ecommerce system in electrical communication with the business partner network the store ecommerce system operable to provide information about online interactions with the customer at a manufacturer's website to the application delivery manager; communicating with a product information system in electrical communication with the business partner network, the product information system operable to provide product information from a manufacturer to the application delivery manager; and communicating with an agent desktop in electrical communication with the business partner network, the agent desktop operable to provide information from an agent to the application delivery manager.

9. The automated method defined in claim 8, wherein the communicated information is one or more of audio, visual or computer data.

10. The automated method defined in claim 8, further comprising:
identifying an event based on one or more of identified information regarding the customer, the customer's position or movement from in the retail store or the identity of the product; and
matching the event to a source of information.

11. The automated method defined in claim 8, further comprising connecting a wireless kiosk associated with the customer with the source of information.

12. A communications system for providing a virtual sales agent to assist a customer in a retail store including a network, the communication system comprising: an identification and personalization component operable to identify the customer using a wireless kiosk in the retail store; a tracking and analysis component operable to collect information on the customer including periodically identifying a position of the customer within the retail store; a predictive opportunity identification component operable to identify an event associated with the customer by using information collected by the tracking and analysis component, a customer-defined preferences and a retailer-defined business rules; an agent-skills based matching component operable to associate an agent having event information to be sent to the customer with the identified event; and a chat and collaborative browsing component operable to connect the agent with the wireless kiosk to allow the agent to communicate the event information to the customer.

13. The communication system defined in claim 12, further comprising a content matching and delivery component operable to match event information with the identified event and communicate the event information to the wireless kiosk for presentation to the customer.

14. The communication system defined in claim 12, further comprising:
a visitor experience database to store information collected by the tracking and analysis component; and
an analysis, refinement and tuning component to modify one or more business rules based on the stored information in the visitor experience database.

15. The communication system defined in claim 14, further comprising an enhance store operation component for extracting the information collected by the tracking and analysis component and improving operations in the retail store based on the collected information.

16. The communication system defined in claim 12, further comprising a dispatching component to dispatch one or more services in response to the event.

17. The communication system defined in claim 16, wherein the service is one or more of retrieving a product from inventory, dispatching an in-store assistant to a customer's position, scheduling a follow-on service, ordering an assembly of a product, or ordering loading of the product into a customer's vehicle.

* * * * *

UNITED STATES PATENT AND TRADEMARK OFFICE
CERTIFICATE OF CORRECTION

PATENT NO. : 7,658,327 B2
APPLICATION NO. : 11/538259
DATED : February 9, 2010
INVENTOR(S) : Tuchman et al.

It is certified that error appears in the above-identified patent and that said Letters Patent is hereby corrected as shown below:

Column 23,
line 48, Delete the word "and".
line 52, Delete the comma "," and replace it with a semi-colon -- ; --.
line 54, Delete the comma "," and replace it with a semi-colon -- ; --.
line 55, Delete the word "the".
line 56, Add the word -- with -- before the word "the".
line 58, Add a comma "," after the word -- network --.

Column 24,
line 29, Delete the comma "," and replace it with a semi-colon -- ; --.

Signed and Sealed this

Thirtieth Day of March, 2010

David J. Kappos
*Director of the United States Patent and Trademark Office*